SUPER-REGENERATIVE DETECTOR GAIN STABILIZING CIRCUIT

Filed Aug. 10, 1959

2 Sheets-Sheet 1

INVENTOR
ARTHUR R. VETTER
BY Mitchell & Bechert
ATTORNEYS

June 27, 1961 A. R. VETTER 2,990,472

SUPER-REGENERATIVE DETECTOR GAIN STABILIZING CIRCUIT

Filed Aug. 10, 1959 2 Sheets-Sheet 2

INVENTOR
ARTHUR R. VETTER
BY Mitchell & Bechert
ATTORNEYS 2,990,472

SUPER-REGENERATIVE DETECTOR GAIN STABILIZING CIRCUIT

Arthur R. Vetter, State College, Pa., assignor, by mesne assignments, to HRB-Singer, Inc., State College, Pa., a corporation of Delaware Filed Aug. 10, 1959, Ser. No. 832,641
7 Claims. (Cl. 250—20)

This invention relates to a super-regenerative detector, and more particularly to a gain stabilizing circuit for the super-regenerative detector.

Super-regenerative detectors are well known in the communications field, and are particularly useful where high sensitivity along with economy or light weight is desired. The advantages of the super-regenerative detector are most evident in the VHF-UHF range. Briefly, a super-regenerative detector is essentially an oscillating detector, in which an amplifier tube is alternated between oscillating and non-oscillating conditions at a low radio-frequency rate. A typical oscillating detector comprises a tuned input circuit for controlling the frequency of oscillation and a feed-back coil for providing the regeneration necessary for maintaining oscillation. The adjustment of the system is such that oscillations are barely able to exist, so that the incoming signal undergoes a considerable amount of regenerative amplification. In the super-regenerative detector, the oscillating detector is alternated between the oscillating and non-oscillating conditions by applying to the grid circuit a low radio-frequency "quench" voltage. The super-regenerative detector is adjusted so that the tube oscillates during the period near the positive peak of the quenching voltage cycle. The oscillations build up from an initial value, determined by the noise voltages in the input circuit to a final value corresponding to the equilibrium value for the oscillator. These oscillations die out when the quenching voltage becomes small or negative, and the tube ceases to be in an oscillating condition.

In certain circuits, for example metering circuits, the high gain and extreme simplicity of the super-regenerative detector could be extremely useful. The super-regenerative detector, however, has not found substantial use in circuits where gain is important because of its inherently poor gain stability, and its sensitivity to supply-voltage variations. The conventional AGS circuits which have been utilized in combination with the super-regenerative detector operate on pulsed signals and are inoperative with continuous wave (CW) signals. For this reason, the use of super-regenerative detectors in circuits where gain is an important consideration has been limited to systems involving pulsed signals.

Accordingly, it is a primary object of this invention to provide a combined super-regenerative detector, and switching means for rapidly switching the detector between a first mode for stabilizing the detector and a second mode in which the detector is in normal receiving condition for receiving CW signals.

It is a further object of this invention to provide a unique gain control for a super-regenerative circuit.

In accordance with a preferred aspect of the invention, there is provided a super-regenerative detector comprising an electronic amplifying device having input, control and output electrodes. A tuned input circuit is coupled to the control electrode and a regenerative feed-back circuit is connected between the output and control electrodes, whereby regenerated energy of sufficient amplitude causes the device to oscillate at the frequency of the tuned input circuit. A quench voltage oscillator is coupled to the control electrode and produces a voltage sufficient to cause the device to oscillate intermittently. The invention is characterized by combining with the detector, an AGS circuit and a utility circuit in alternating timed sequence. During one half period of this timed cycle, energy from the detector is applied to the AGS circuit and during the second half of the cycle, an input signal is applied to a utility circuit. The time constant of the AGS circuit is selected more than the switching time, so that a control voltage fed back from the AGS circuit to the detector circuit continuously stabilizes the gain of the detector circuit. In this manner, the input signal is amplified and not subject to spurious fluctuations of the detector, caused by either supply voltage variations or poor gain stability.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
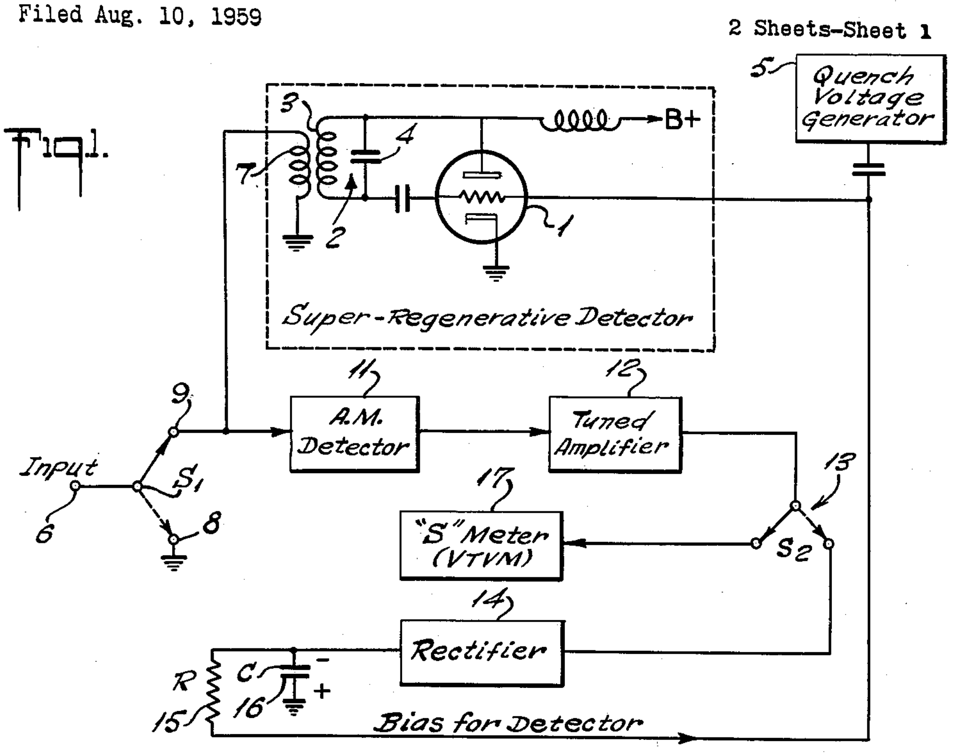
FIGURE 1 is a schematic diagram of an embodiment of the invention.

Referring first to the super-regenerative detector portion of the circuit illustrated in FIGURE 1, shown within dashed lines, the detector comprises an amplifier 1, such as a vacuum tube triode, having cathode, grid and plate electrodes. Alternatively, the amplifier may consist of a transistor having emitter base and collector electrodes. To encompass the different possible amplifier embodiments, the electrodes will be referred to as input, control and output electrodes.

A tuned input circuit 2, comprising a coil 3 and a capacitor 4, is coupled between the control and output electrodes. The coil 3 constitutes also a regenerative feed-back coil, through which the feed-back energy flows and causes the amplifier to go into oscillation. The conventional power supply voltage is applied to the output electrode of the amplifier 1. Quenching voltage is applied from an oscillator 5 to the control electrode of the amplifier 1. The quenching voltage is cyclic and is of such amplitude that the resulting feed-back energy is sufficient to cause the amplifier to oscillate intermittently. The oscillation frequency is determined by the frequency of the tuned circuit 2. The period at which the amplifier 1 oscillates is determined by the frequency of the quenching voltage oscillator.

An input signal is applied over terminal 6 to a coil 7, constituting the primary of a transformer, of which coil 3 is the secondary.

Figure 2:
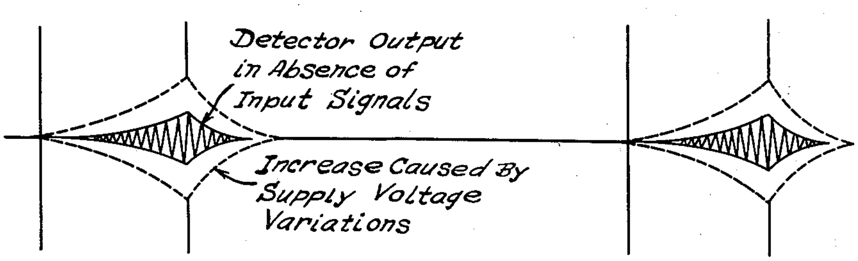
FIGURE 2 is a curve showing a typical output of a super-regenerative detector in the absence of an input signal.
Figure 3:
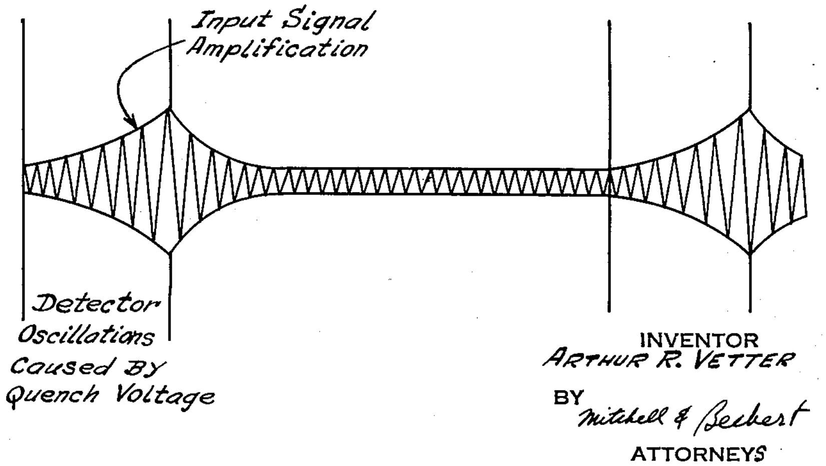
FIGURE 3 is a similar curve, showing the output of the detector in the presence of an input signal.

As explained previously, the oscillating detector is permitted to oscillate only in short bursts, the period of which is controlled by the quenching voltage. The bursts of oscillation on the control electrode of the detector are shown by solid line in the curve of FIGURE 2. In the absence of an input signal, the oscillations build up from the very small noise voltages which are present. In the presence of an input signal, the oscillations, of course, build up from the stronger signal voltage. Thus, as shown in FIGURE 3, the pulses are larger for the signal input. The exponential build-up characteristic of the detector permits a relatievly small signal to produce very large pulses; the high gain of the super-regenerative circuit is a result of this exponential characteristic.

The exponential build-up also renders the super-regenerative circuit extremely sensitive to supply voltage variations. As the supply voltage increases, the detector gain increases exponentially, and the oscillations build up more quickly, as shown by dashed lines in FIGURE 2. It is apparent, therefore, that both the input signal strength and the detector gain influence the size of the pulse.

In accordance with the present invention, the gain is stabilized by a unique circuit combination, shown in FIGURE 1.

The input signal is applied over the terminal 6 alternately to a ground terminal 8, and to an input terminal 9 for the detector. The alternating connections may be effected by any suitable switching means, shown schematically, as by movable contact 10; one position of the contact being shown in dashed lines and the other position being shown in solid line. The switching means may be a vibrator, relay, diodes, or other electronic switching device.

During the time that the switch is connected to ground terminal 8, the output from the super-regenerative detector is applied to an amplitude modulating detector 11. The detected envelope corresponding in amplitude to the noise voltages generated by the super-regenerative circuit is applied to a tuned amplifier 12, which is tuned to the quenching frequency. The output of the amplifier 12 is applied over switch 13, which is similar to and synchronously operated with the switch 10. Similar switch positions are shown by correspondingly drawn lines. Thus, while the input switch 10 is grounded, the switch 13 connects the tuned amplifier 12 to a rectifier 14.

The rectifier 14 is part of the AGS circuit and is preferably connected to produce a negative direct-current voltage, which serves to bias the super-regenerative detector tube 1. The output of the rectifier 14 is applied to a time-constant circuit, comprising a resistor 15 and a capacitor 16. The time constant of this circuit is long compared to the switching frequency. Ostensibly, the output from the rectifier 14 is proportional to the detector output, but of opposite sense, whereby as the pulse amplitude from the super-regenerative detector increases, the D.C. output from the rectifier increases in a negative direction, and this D.C. voltage controls the gain of the detector tube 1.

In the alternate mode of operation, that is switches 10 and 13 being connected in the position shown by solid lines, the input signal is amplified in the super-regenerative circuit and is applied successively to the amplitude detector 11, tuned amplifier 12, over switch 13 to a utility circuit 17, shown as an "S" meter. Although the circuit diagram of FIGURE 1 suggests that the input signal is applied simultaneously to the amplitude detector 11, and to the super-regenerative circuit, the input signal is of such low amplitude that it has no effect on the amplitude detector 11. The signal detected in the detector 11, therefore, is the amplified output of the super-regenerative circuit. Since the time constant of the AGS circuit is substantially longer than the switching frequency, the control voltage, in effect, is constantly applied to the detector 1.

Figure 4:
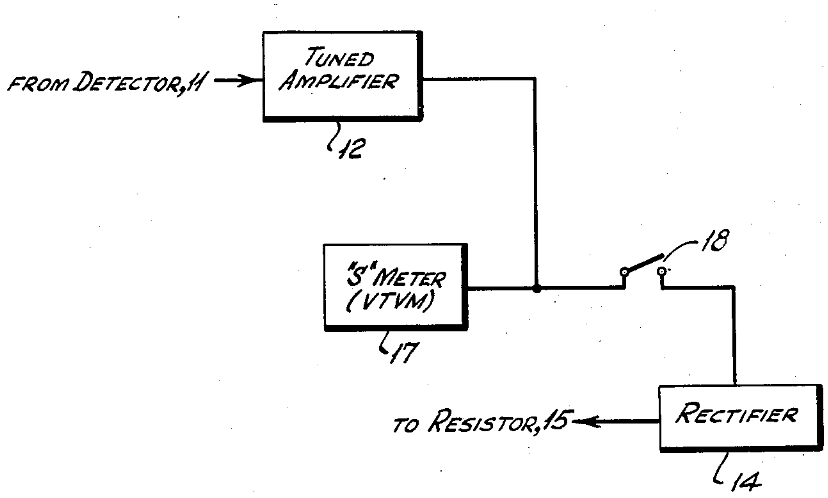
FIGURE 4 is a block diagram of an alternative switching arrangement for the AGS circuit.

The switching arrangement at the output of the tuned amplifier 12 may be simplified as shown in FIGURE 4. The switch 13 in FIGURE 1 is of the single pole, double throw type and in FIGURE 4, the switch 18 is of the single pole, single throw type.

In the embodiment of FIGURE 4, the "S" meter is continuously connected to the tuned amplifier 12. The switch 18 intermittently and in synchronism with the input switch connects the rectifier 14 to the tuned amplifier output.

The "S" meter may be continuously connected to the tuned amplifier because the average and peak outputs of the amplifier are proportional to the voltages applied to the input terminal 6.

Figure 5:
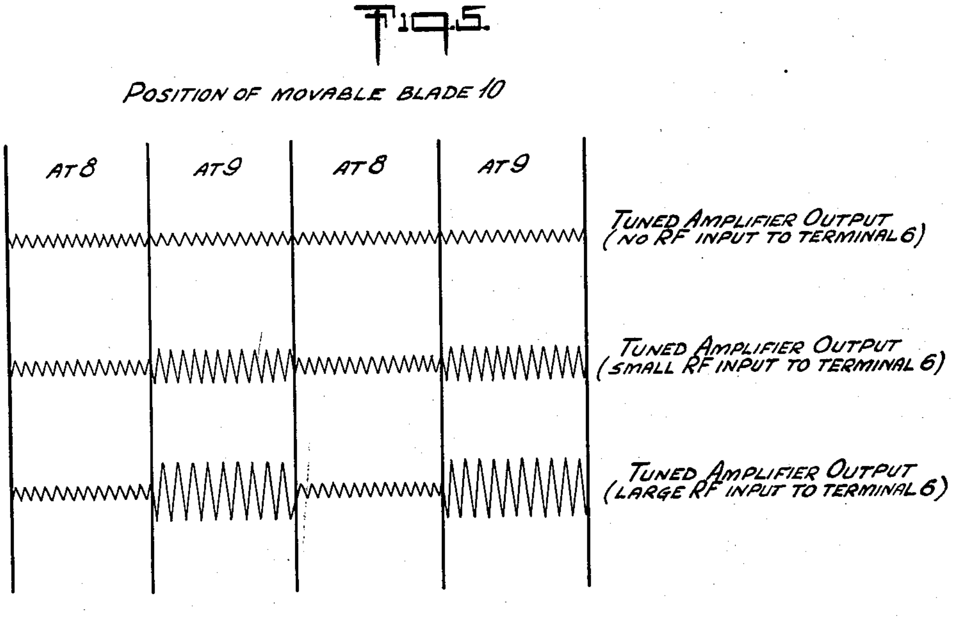
FIGURE 5 shows representative waveforms for the alternative switching embodiment shown in FIGURE 4.

The operation of the alternative embodiment is evident from FIGURE 5, showing the output of the tuned amplifier for the different positions of the input switch 10.

Although the invention has been described as depending on noise for a reference signal in gain stabilization, a constant signal may instead be employed. It is essential only that the super-regenerative circuit gain be stabilized.

While the foregoing description sets forth the principles of the invention in connection with specific apparatus, it is to be clearly understood that this description is made only by way of example and not as a limitation of the scope of the invention as set forth in the objects thereof and in the accompanying claims.

What is claimed is:

1. In combination, a super-regenerative detector having an input and an output, and including means for rendering said detector intermittently oscillatory, a signal source, a first means for alternately connecting and disconnecting said signal source from the input of said detector at a given rate, means for coupling the intermittent oscillations out of said detector, a utility circuit responsive to the output of said detector, a gain stabilization circuit having a long time constant relative to said rate and a feedback connection to said detector for controlling the gain thereof, and a second means, operating synchronously with said first means, for alternately connecting and disconnecting said gain stabilization circuit to said coupling means, said first and second means being adjusted so that when said signal source is disconnected from the input of said detector, said gain stabilization circuit is connected to said coupling means, whereby said detector is stabilized in the absence of said signals.

2. In combination, a super-regenerative detector comprising an electronic amplifier, a tuned input circuit coupled to said amplifier, a regenerative feed-back circuit for said amplifier, whereby in response to regeneration said device oscillates at the frequency of said tuned input circuit, means for causing said amplifier to oscillate intermittently, an amplitude detector coupled to the output of said amplifier, a second amplifier tuned to the intermittent frequency and connected to the output of said amplitude detector, an automatic gain stabilization circuit having a predetermined time constant, the output from said stabilization circuit being connected to said electronic amplifier for controlling the gain thereof, a source of signals, a first means for alternately connecting and disconnecting said source of signals from the input of said electronic amplifier at a predetermined rate, a signal utilization circuit, and a second means, operating in synchronism with said first means, for alternately connecting and disconnecting said gain stabilization circuit from said second amplifier, said first and second means being adjusted so that when said signal source is disconnected from the input of said amplifier, said gain stabilization circuit is connected to said second amplifier, the time constant of said stabilization circuit being long relative to said rate, whereby the output from said stabilization circuit is effectively continuously applied to said amplifier.

3. The combination according to claim 2, wherein said second means includes means for alternately switching said utility circuit and said gain stabilization circuit to said second amplifier, whereby when said source of signals is connected to the input of said electronic amplifier, said utility circuit is connected to said second amplifier.

4. The combination according to claim 2, wherein said stabilization circuit comprises a rectifier connected to the output of said second amplifier for producing an output varying proportionately with the output of said second amplifier, in the absence of said signals, but in opposite sense, and a resistor and a capacitor constituting a time-constant circuit coupled to the output of said rectifier.

5. The circuit according to claim 2, wherein said utilization circuit comprises a field strength meter.

6. In combination, a super-regenerative detector comprising an electronic amplifier device having input, control and output electrodes, a tuned input circuit coupled to said control electrode, a regenerative feed-back circuit connected between said output and control electrodes, whereby in response to regeneration said device oscillates at the frequency of said tuned input circuit, a quench voltage oscillator coupled to said control electrode and producing a suffiicent voltage to cause said device to oscillate, an amplitude detector coupled to the output electrode of said device, a second amplifier tuned to the quench voltage oscillator frequency and connected to the output of said amplitude detector, whereby the output from said second amplifier is proportional to the quench voltage, an automatic gain stabilization circuit comprising a rectifier connected to the output of said amplifier for producing an output varying proportionately with the output of said amplifier but in opposite sense, a resistor and a capacitor constituting a time constant circuit coupled to the output of said rectifier, the output from said stabilization circuit being connected to said control electrode for controlling the gain of said amplifying device, a source of signals, a signal utilization circuit, a first means for periodically switching said source of input signals into connection with said control electrode, and a second means, synchronized with said first means, for periodically switching said second amplifier between said utilization circuit and said stabilization circuit, said first and second switching means being arranged so that while said source of input signals is connected to said control electrode the second amplifier is connected to said utilization circuit, and when the source of said input signals is disconnected from said control electrode said second amplifier is connected to said stabilization circuit, the time constant of said stabilization circuit being of greater duration than the switching time, whereby the output from said stabilization circuit is effectively continuously applied to said electronic amplifier for controlling the gain thereof.

7. The combination according to claim 6, wherein said utilization circuit comprises an "S" meter.

References Cited in the file of this patent

UNITED STATES PATENTS

| | | |
|---|---|---|
| 2,398,214 | Emerson | Apr. 9, 1946 |
| 2,429,513 | Hanson et al. | Oct. 21, 1947 |
| 2,481,852 | Loughlin | Sept. 13, 1949 |
| 2,499,429 | Toth | Mar. 7, 1950 |